United States Patent
Durand et al.

(10) Patent No.: US 6,656,524 B2
(45) Date of Patent: Dec. 2, 2003

(54) CONTINUOUS PROCESS FOR GAS PHASE COATING OF POLYMERIZATION CATALYST

(75) Inventors: Daniel Claude Durand, Martigues (FR); Estelle Marie Joelle Meurice, St Mitre-les-remparts (FR); Frederic Robert Marie Michel Morterol, Sausset-les-Pins (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/774,612

(22) Filed: Feb. 1, 2001

(65) Prior Publication Data

US 2001/0041219 A1 Nov. 15, 2001

Related U.S. Application Data

(63) Continuation of application No. PCT/GB99/02635, filed on Aug. 10, 1999.

(30) Foreign Application Priority Data

Aug. 10, 1998 (EP) .............................................. 98430020

(51) Int. Cl.⁷ ........................... B05D 7/00; C23C 16/44; C08F 2/34; C08F 4/00
(52) U.S. Cl. ........................ 427/212; 427/215; 427/216; 427/220; 427/248.1; 427/255.6; 526/64; 526/904; 118/716
(58) Field of Search ............................... 427/212, 213, 427/216, 220, 248.1, 255.23, 255.28, 255.6, 215, 221; 526/86, 901–908, 919, 920, 943, 88, 64; 118/716, 722

(56) References Cited

U.S. PATENT DOCUMENTS

| | | | | |
|---|---|---|---|---|
| 4,129,701 A | * | 12/1978 | Jezl et al. | 526/65 |
| 4,130,699 A | * | 12/1978 | Hoff et al. | 526/67 |
| 5,122,583 A | * | 6/1992 | Ewen et al. | 502/104 |
| 5,241,023 A | * | 8/1993 | Brule et al. | 526/70 |
| 5,439,991 A | * | 8/1995 | Colman et al. | 526/64 |
| 5,859,156 A | * | 1/1999 | Calderon et al. | 526/64 |
| 6,350,054 B1 | * | 2/2002 | Lee et al. | 366/325.92 |

FOREIGN PATENT DOCUMENTS

| | | |
|---|---|---|
| EP | 0 081 407 A1 | 6/1983 |
| EP | 0 704 464 A2 | 4/1996 |
| EP | 0 816 394 A1 * | 1/1998 |
| EP | 0 819 706 A1 | 1/1998 |
| WO | WO 97/33920 A1 * | 9/1997 |

* cited by examiner

Primary Examiner—Shrive P. Beck
Assistant Examiner—Wesley Markham
(74) Attorney, Agent, or Firm—Finnegan, Henderson, Farabow, Garrett and Dunner, L.L.P.

(57) ABSTRACT

A continuous process for gas phase coating of polymerization catalyst. The polymerization catalyst is introduced in a gas phase plug flow type reactor wherein it is submitted to polymerization conditions in the presence of at least one monomer such that at least 95% by weight of the produced coated catalysts have a coating yield comprised between 0.5 to 2 times the average coating yield.

6 Claims, 3 Drawing Sheets

CONTINUOUS PROCESS FOR GAS PHASE COATING OF POLYMERIZATION CATALYST

This application is a continuation of international application number PCT/GB99/02635, filed on Aug. 10, 1999, and claims the priority of European Patent Application No. 98430020.2, filed Aug. 10, 1998, the content of both which is incorporated herein by reference.

BACKGROUND OF THE INVENTION

The present invention relates to a continuous process for on line gas phase coating of polymerisation catalyst. The present invention also relates to a continuous gas phase fluidised bed process for the production of polyolefins having improved levels of productivity without fouling, more particularly of polyethylene, comprising the introduction of a coated polymerisation catalyst obtained by the continuous gas phase coating process according to the present invention.

In the fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed comprises a bed of growing polymer particles, polymer product particles and catalyst particles. This bed is maintained in a fluidised condition by the continuous upward flow from the base of the reactor of a fluidising gas which comprises recycle gas from the top of the reactor together with make-up feed. The fluidising gas enters the bottom of the reactor and is passed, preferably through a fluidisation grid, to the fluidised bed.

The polymerisation of olefins is an exothermic reaction and it is therefore necessary to provide means to cool the bed to remove the heat of polymerisation. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomeric olefin, optionally together with, for example, an inert diluent gas such as nitrogen and/or lower alkanes such as ethane, propane, butane, pentane, hexane, and/or a gaseous chain transfer agent such as hydrogen. Thus the recycle gas serves to supply the monomer to the bed, to fluidise the bed, and to maintain the bed at the desired temperature. Monomers consumed by the polymerisation reaction are normally replaced by adding make up gas to the recycle gas stream.

It is well known that the production rate (i.e. the space time yield in terms of weight of polymer produced per unit volume of reactor space per unit time) in commercial gas fluidised bed reactors of the above-mentioned type is restricted by the maximum rate at which heat can be removed from the reactor. The rate of heat removal can be increased for example, by increasing the velocity of the recycle gas and/or reducing the temperature of the recycle gas and/or changing the heat capacity of the recycle gas. However, there is a limit to the velocity of the recycle gas which can be used in commercial practice. Beyond this limit the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practise is normally determined by the temperature of the industrial cooling water available on site. Refrigeration can be employed if desired, but this adds to the production costs. Thus, in commercial practice, the use of cooled recycle gas as the sole means of removing the heat of polymerisation from the gas fluidised bed polymerisation of olefins has the disadvantage of limiting the maximum production rates obtainable.

The prior art suggests a number of methods for increasing the heat removal capacity of the recycle stream, such as U.S. Pat. No. 4,543,399, U.S. Pat. No. 4,588,790, U.S. Pat. No. 5,352,749, ±3 U.S. Pat. No. 5,436,304, U.S. Pat. No. 5,453,471 and U.S. Pat. No. 5,541,270, the contents of which are hereby incorporated by reference.

The above-disclosed processes have all contributed to increase the levels of productivity which are achievable in fluid bed polymerisation processes, which is also one of the objectives according to the present invention. It is known however in the art that a major problem encountered in those high productivity polymerisation processes is the fouling phenomena which can occur at any time in the reactor.

One of the main problems encountered in the fluid bed processes for the production of polyethylene and ethylene copolymers is the reactor fouling, as usually referenced in the literature. The use of catalytic system presenting an increasingly high activity, especially at polymerisation start-up, tends also to have a detrimental impact on this fouling phenomenon. Today, those problems are further exacerbated at the industrial scale where the production capacity of polymerisation reactors tend to increase, e.g. like for industrial ethylene fluidised bed polymerisation where more than 350 Mkg of polyethylene per year can be achieved in a single reactor.

The impact of fouling or agglomerates is very high since agglomerates may grow quite large before coming loose and falling into the fluid bed. Once fallen into the main fluid bed, they can obstruct powder fluidisation, circulation, and withdrawal. When powder withdrawal slows or the bed fuses, the reactor production must be stopped and the reactor vessel opened for cleaning. This is a very costly production outage.

There are a lot of disclosures in prior art of those fouling phenomena as well as many different tentative explanations for its occurrence. Sometimes the type of catalyst used is said to be responsible for the fouling; static electricity has also been indicated as being a cause thereof; operating conditions have also been considered as the most important criteria; in fact, the man in the art has developed many different theories and proposals for explaining and trying to reduce fouling phenomena. It would be a major improvement in the art if all these fouling phenomena could be either considerably reduced or eliminated whatever the explanation of their occurrence.

The Applicants have now unexpectedly found that the fouling problems usually encountered in the above-disclosed prior art process can be considerably reduced or even eliminated when using the process according to the present invention.

We have now found a process which is easy to implement, which could be applied with all types of polymerisation catalysts, which considerably reduces or even eliminates the potential fouling phenomena inside the reactor, and which further brings many other advantages as will be apparent from the present disclosure.

The present invention provides a new continuous process allowing an improved on line gas phase coating of polymerisation catalyst.

Different prior art documents described the coating of polymerisation catalysts.

EP-622382 discloses a propylene/ethylene copolymerisation using a coated catalyst obtained by treating with one monomer a mixture of a conventional supported heterogeneous Ziegler-Natta catalyst component, an organo-Al cocatalyst and an electron-donor. The coated catalyst has a polymer coating:catalyst weight ratio below 10:1. The use of the ex-situ or in-situ produced coated catalyst gives an increase in randomness without the need for other process or catalyst system changes.

EP-588277 discloses a continuous olefin polymerisation process comprising the addition of a coated catalyst wherein the catalyst has a polymeric coating in a weight ratio of coating:catalyst of less than 10:1.

EP-338676 discloses a Ziegler-Natta type catalyst for (co)polymerisation of propylene in the form of a pre-activated support. The pre-activated support is treated with TiCl4; the treated support is placed in contact with an alkyl aluminium halide and propylene, optionally mixed with ethylene and/or 4–8C alpha-olefin to form a coated catalyst containing 0.1 to 10 g of propylene (co)polymer per mole of Ti.

Those prior art documents disclose many different advantages resulting from the use of the so prepared coated catalysts. However, the Applicants have found that the use of those prior art coated catalysts does not allow to overcome the primary fouling concern, as discussed hereabove.

SUMMARY OF THE INVENTION

Thus, according to the present invention, there is provided a continuous process for gas phase coating of polymerisation catalyst characterised in that the polymerisation catalyst is introduced in a gas phase plug flow type reactor wherein it is submitted to polymerisation conditions in the presence of at least one monomer such that at least 95% by weight of the produced coated catalysts have a coating yield comprised between 0.5 to 2 times the average coating yield.

DETAILED DESCRIPTION OF THE INVENTION

Figure 1:
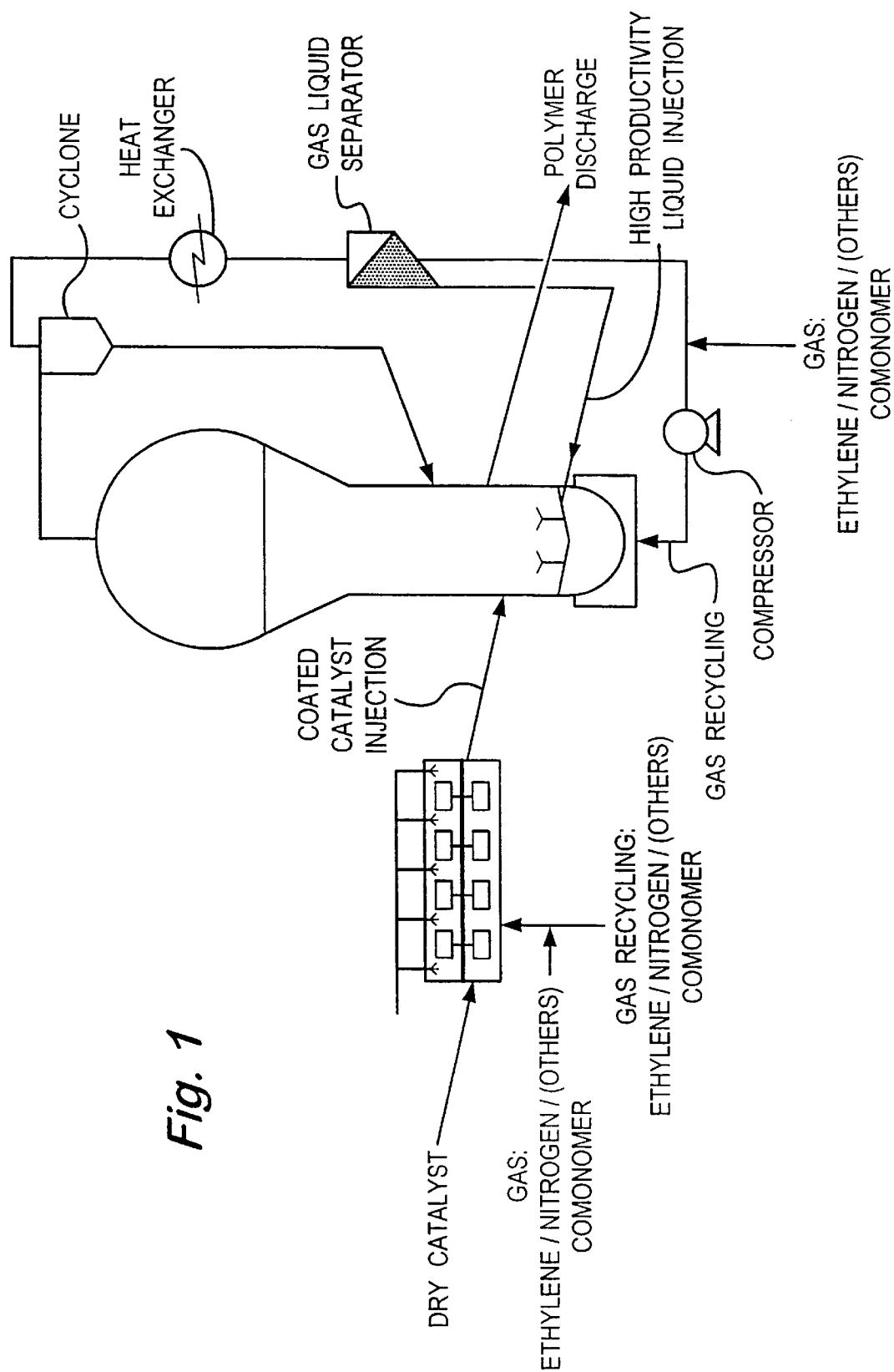
FIG. 1 shows diagrammatically an illustration of an apparatus for gas phase polymerization of olefin(s) according to the present invention.

Plug flow type reactors are well known in the art. In term of flow pattern, a plug flow reactor is characterised by its limiting behaviour with no axial mixing. It is usually contrasted to the continuous stirred tank reactor which is characterised by its complete mixing limiting behaviour.

According to the present invention, a plug flow type reactor designates a reactor which approaches such limiting behaviour with no axial mixing. Continuous stirred tank reactors are therefore specifically excluded from the present invention. In terms of flow patterns comparison, the plug flow type reactor according to the present invention is preferably equivalent to a battery of at least three continuous stirred tank reactors, more preferably of at least four continuous stirred tank reactors, most preferably of at least five continuous stirred tank reactors.

The plug flow type reactor according to the present invention is preferably a tubular reactor.

According to the present invention, the plug flow type reactor is preferably horizontal, or ideally slightly inclined with a downward angle formed with the horizontal base line comprised between 1 and 7°; the downward angle (from the inlet to the outlet of the reactor) will induce through a gravity effect an improved catalyst flow throughout the reactor.

Preferably, it has a substantially circular crossection containing a centrally located drive shaft extending longitudinally through the reactor to which are attached a plurality of adjacently located paddles. Said paddles are such that they cause essentially no backward movement of the particulate matter contained in said reactor and extend transversely within and to a short distance from the internal surfaces of said reactor. The reactor may be divided into individually gas-composition-controllable and polymerisation-temperature-controllable polymerisation compartments, so constructed to control gas intermixing and movement of the particulate matter between said compartments.

The reactor may also comprise one or more reactor off-gas outlets along the topward part, one or more vapor recycle inlets along the bottomward portion, one or more catalyst addition inlets, one or more additives inlets (e.g. quench liquid), and takeoff means for the resulting coated catalyst.

The coating process according to the present invention can be applied to all types of polymerisation catalysts. It has proven to be advantageously used for catalysts systems of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of transition metal complexes, magnesium complexes and halogen containing complexes. Examples thereof can be found, e.g. in U.S. Pat. No. 4,260,709, EP0598094, EP0099774 and EP0175532. The process is also particularly suitable for use with Ziegler catalysts supported on silica, e.g. in WO9309147, WO9513873, WO9534380 and WO9905187.

The process is especially suitable for use with metallocene type catalysts, such as e.g. those described in EP0129368, EP0206794, EP0420436 and EP0416815. High-activity catalyst consisting essentially of a chromium oxide activated by a heat treatment and associated with a granular support based on a refractory oxide can also advantageously be used, e.g. such as those described in EP0275675, EP0453116, WO99/12978.

It is also possible to use late transition metal e.g platinum or palladium, catalyst complexes such as those described in WO96/23010.

Catalysts such as those described in BP application WO99/02472 may also advantageously be used.

The catalyst can be introduced into the plug flow type reactor under any form, e.g. as a slurry or, preferably, in a dry stage.

The monomer(s) used during the coated process will depend upon the nature of the consequent polymerisation process.

According to a preferred embodiment of the present invention, the monomer is chosen among one or more of the alpha-olefins having from 2 to 40 carbon atoms, preferably those having from 2 to 8 carbon atoms, more preferably ethylene and/or propylene and/or butene.

According to the present invention, at least 95% by weight of the produced coated catalysts have a coating yield comprised between 0.5 to 2 times the average coating yield. The coating yield as used herein is defined by the weight ratio of the coated polymerisation catalyst to the non-coated polymerisation catalyst. The use of a plug flow type reactor according to the present invention ensures that substantially none of the polymerisation catalyst subjected to the coating process exits the coating reactor in a non-polymerised form; in fact, the produced coated polymerisation catalysts are characterised by a narrow coating yield distribution. According to a preferred embodiment of the present invention, the efficiency of the plug flow type reactor is such that there is substantially no coated polymerisation catalyst exhibiting a coating yield lower than 20% of the average coating yield; similarly, it is preferred that there is substantially no coated polymerisation catalyst exhibiting a coating yield higher than 180% of the average coating yield.

The plug flow type reactor according to the present invention is characterised by a narrow residence time distribution of the coated polymerisation catalyst. According to a preferred embodiment of the present invention, more than 90% by weight of the coated polymerisation catalysts have a residence time comprised between 0.7 to 1.8 times the average residence time. There is preferably substantially no coated polymerisation catalyst exhibiting a residence time lower than 35% of the average residence time.

When using the coated polymerisation catalysts obtained according to the present invention in a consecutive polymerisation process, the Applicants have surprisingly found that the fouling problems experienced in the past could be resolved, particularly for continuous gas phase polymerisation.

While not wishing to be bound to the following explanation, the Applicants believe that one of the reasons behind this success comes from the narrow coating yield distribution characteristic exhibited by the coated polymerisation catalyst according to the present invention.

For example, it is known that the active, growing powder in a fluidised bed polyolefin reactor is composed of a wide range of particle sizes. Thus, this powder is referred to as having a broad particle size distribution. Some of the reasons for this broad size distribution are the size range of the initial catalyst particles charged to the reactor, the difference in catalytic activity of each catalyst particles, the difference in residence time for each growing polymer particle and the agglomeration of polymer particles. It is believed that the narrow coating yield distribution characteristic exhibited by the coated polymerisation catalyst according to the present invention greatly influences the particle size distribution of the produced polymer, and hence eliminates the fouling phenomenon.

For example, when the coated catalyst is used in a gas phase reactor, the on line coating in a plug flow type reactor has the following general advantages, whatever the catalyst system used: solid handling only (no solvent) with dry catalyst injection, potential for polymerisation or copolymerisation with higher alpha olefins (C6), smooth reaction with controlled kinetics (no initial particle overheating and good morphology control) using control parameters such as a low monomer partial pressure and a low reaction temperature, low residence time (one hour or less) with a small reactor volume requirement (less than 0.5 m3) to feed a large scale plant at more than 300 Mkg, plug flow type reactor (equivalent to 6 to 8 continuous stirred tank reactors) allows for particle residence time control with no ungrown catalyst particle out of the main reactor, static electricity at injection in polymerisation reactor reduced with potential additional benefits of an antistatic agent introduced during the coating process, coated catalyst dispersion in the fluid bed eased which reduces hot spots with very active catalysts such as metallocenes, possibility to add a small fraction of the activator to better control the kinetics profile and increase the final polymerisation yield, smooth agitation (low rotation speed) and low gas velocity to give good mixing with low entrainement and better morphology at the end. The use of the on line gas phase coating of catalyst further allows:

- to modify the initial kinetic profile to allow the catalyst to disperse before reaching its peak activity, thus homogenising kinetic profile
- the coating in gas phase to avoid catalyst modification and morphology evolution observed in slurry
- the possibility to spray antistatic and catalyst activator in solution
- a smooth control of the initial reaction within the targeted melt index range (at low ethylene pressure and low temperature) with ethylene flow rate control and comonomer control
- the potential to increase the final polymer yield and to decrease the residence time (higher reactor capacity)
- a reduction in the co-catalyst usage and overall catalyst cost per tonne
- easier transitions between Ziegler and metallocenes catalysts
- to improve the plant reliability and facilitate the access to large scale efficient and flexible plants.

The coating process according to the present invention is ideally incorporated upstream of conventional industrial gas phase polymerisation process like e.g. the BP Chemicals gas phase polyethylene process wherein the coated catalyst feeding of the gas phase reactor is made in a continuous mode.

FIG. 1 shows diagrammatically an illustration of an apparatus for gas phase polymerisation of olefin(s) according to the present invention. The apparatus includes a fluidised bed reactor fitted with a top and a base comprising a fluidisation grid, and consisting of a cylinder with a vertical side wall and a disengagement chamber above the said cylinder, an entry chamber for a reaction gas mixture, situated under the grid, and an external circulation conduit for the reaction gas mixture, connecting the top of the reactor to the entry chamber for the reaction gas mixture and including a compressor and at least one exchanger. The left side of the figure shows an illustration of the plug flow reactor wherein the catalyst is injected and from which the coated catalyst exits and enters the polymerisation reactor.

The process according to the present invention is particularly suitable for the manufacture of polymers in a continuous gas fluidised bed process. Illustrative of the polymers which can be produced in accordance with the invention are e.g. EPR (polymer of ethylene with propylene), EPDM (polymer of etylene copolymerised with propylene and a diene such as hexadiene, dicyclopentadiene or ethylidene norborene).

In an advantageous embodiment of this invention, the coated polymerisation catalyst is used for the preparation of polyolefins, preferably copolymers of ethylene and/or propylene and/or butene. Preferred alpha-olefins used in combination with ethylene and/or propylene and/or butene are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more C4–C8 alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4–C8 monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4-methylpent-1-ene. Ethylene or propylene or butene-1 is present as the major component of the monomers, and preferably is present in an amount of at least 70%, more preferably at least 80% of the total monomers/comonomers.

The process according to the present invention is preferably used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

The process is particularly suitable for polymerising olefins at an absolute pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used and the polymer properties desired.

Thus, according to a preferred embodiment, the present invention also relates to a continuous gas fluidised bed process for the polymerisation of olefin monomer selected from (a) ethylene, (b) propylene, (c) mixtures of ethylene and propylene, (d) butene and (e) one or more other alpha-olefins mixed with (a), (b), (c) and (d) in a fluidised bed reactor by continuously recycling a gaseous stream comprising at least some of the olefin through the fluidised bed in said reactor in the presence of a coated polymerisation catalyst under reactive conditions, comprising the introduction of a coated polymerisation catalyst characterised in that the coated polymerisation catalyst is obtained by the continuous gas phase coating process according to the present invention.

The Applicants have unexpectedly obtained major improvements by applying the present invention to the conventional gas phase fluidised bed polymerisation process.

Figure 2:
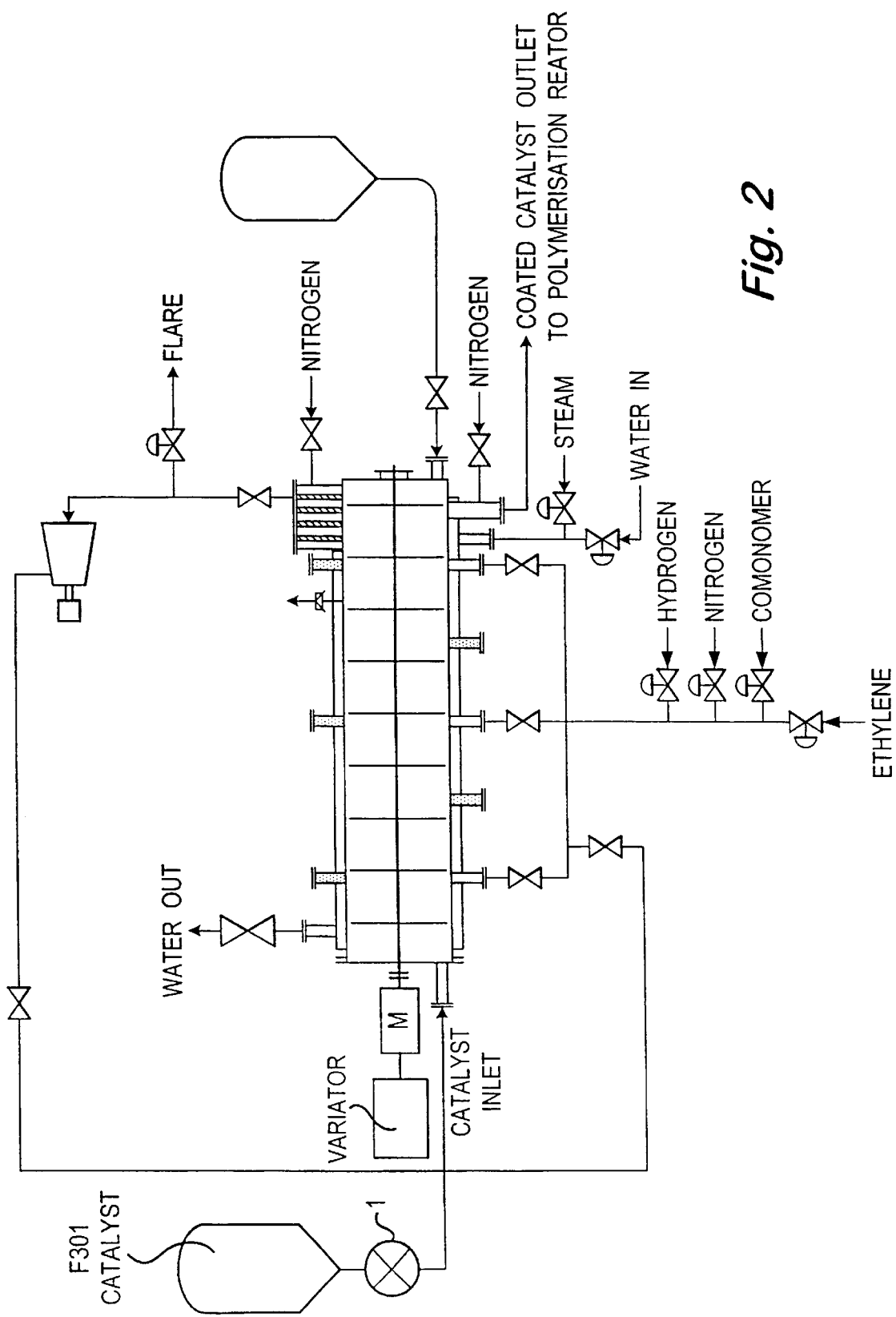
FIG. 2 is an illustration of an apparatus for carrying out the process according to the present invention.
Figure 3:
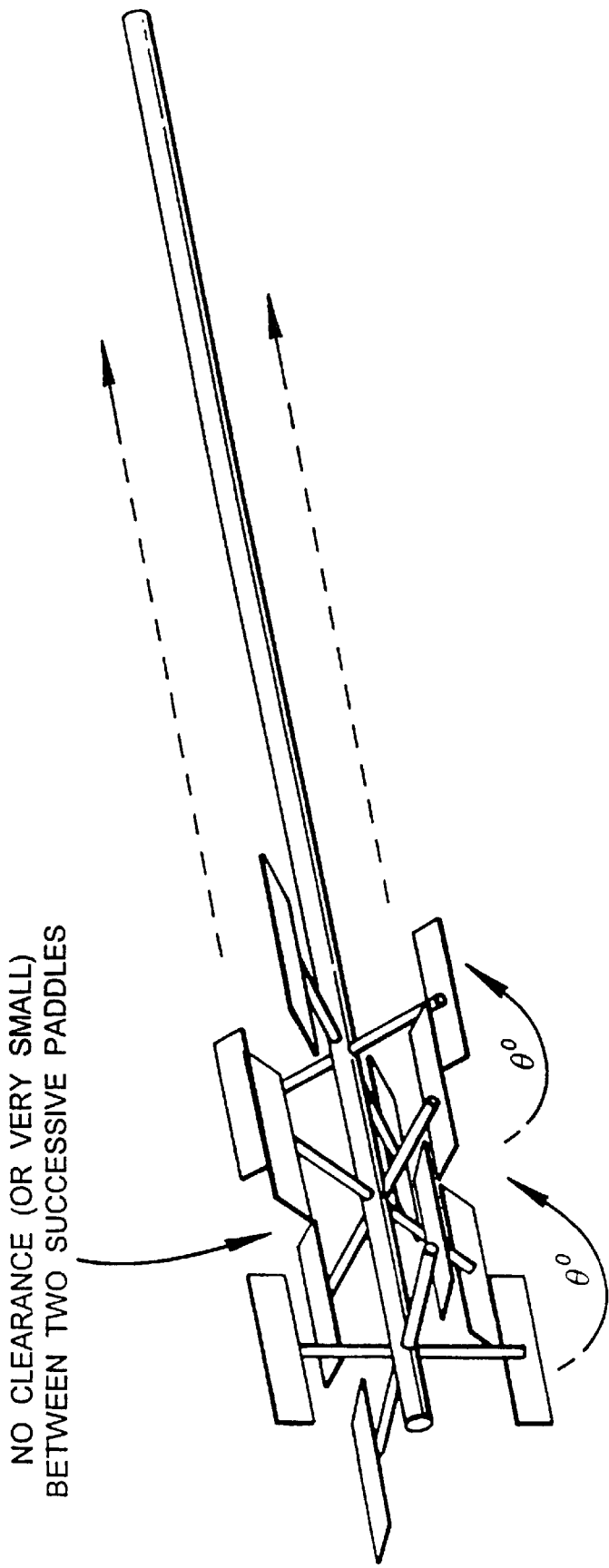
FIG. 3 is an illustration of an agitator for use in carrying out the process according to the present invention.

FIGS. 2 and 3 are illustrations of an apparatus and process according to the present invention. The present invention is therefore not limited to these particular embodiments:

The catalyst is fed from a F301 vessel to a "mini-écluseur" (1) and then introduced into the bottom of the horizontal plug flow reactor, with a nitrogen flow. The flow rate of catalyst introduced into the reactor is controlled by the mini-écluseur speed and cross-checked with the weight of the F301 vessel.

Start-up powder is preferably initially fed at start-up to allow good mixing of the small amount of catalyst injected into the reactor and to allow the reactor to work properly. Injections of ethylene, optional comonomer, hydrogen and nitrogen, take place at the bottom of the reactor; there are preferably at least three different injections points along the reactor to allow good dispersion of reactants within the reactor. Three flow indicators allow to determine the right opening of valves to have equal flow rates at each injection point. Mixing of reactant occurs before in the line and the flow rate of each reactant is controlled thanks to a regulation control system. Optional comonomer is preferably either butene or hexene. Provision injection points are kept to add other products. The plug flow reactor is preferably a commercial reactor able to feed a 300 KTPA gas phase plant. It can polymerise around 16 kg/h of catalyst at 10 gPE/gcata, with, e.g., internal dimensions as follows:

Length=1.88 m
Diameter=0.42 m
L/D=4.5.

Preferably, the normal operating conditions during coating are a temperature comprised between 20 and 100° C., more preferably between 40 and 60° C. Preferably, the normal operating conditions during coating are a total pressure (relative) comprised between 1 and 40 bar, more preferably between 5 and 25 bar. Preferably, the normal operating conditions during coating are a residence time comprised between 10 minutes to 4 hours, more preferably between 40 and 80 minutes. Preferably, the normal operating conditions during coating are a fluidisation velocity comprised between 3 and 10 cm/s.

Preferably, the normal operating conditions during coating are a coating yield comprised between 2 and 100 g of coated catalyst per g of catalyst, more preferably between 4 and 20 g of coated catalyst per g of catalyst.

Control of gas phase is done by the control of ethylene, comonomer and hydrogen flow rates. The control of pressure is done by controlling the nitrogen flow rate or by opening to the flare (after the gas outlet). Control of temperature is carried out by controlling the flow rate of industrial water (at 30° C.) and vapour (90–100° C.) in the double envelope of the reactor. If needed, a heat exchanger can also be used.

A filter with cartridges can be installed in order to avoid entrained particles going to the flare. The entrained particles are recovered into the reactor thanks to a nitrogen flow which disengages these particles from the filter cartridges.

The plug flow behaviour of the reactor is primarily obtained by the special design of the agitator. The agitator is placed inside the reactor and consists preferably of about 5 to 12 paddle elements. As indicated in FIG. 3, one paddle element consists of 4 paddles separated by an angle of 90° and fixed on the agitator shaft.

The agitator is driven by a motor and can run at different speeds. The system reactor-agitator is preferably inclined downward (from inlet to outlet) by a small angle (between 1 and 7°) in order to allow good product progress in the reactor. Successive paddles on the agitator shaft are shifted by an angle θ°, preferably comprised between 30 and 70°. Two successive paddles on the shaft are separated by a distance corresponding to the length of one paddle element plus a clearance of a few millimeters, more preferably between 1 and 5 mm.

The paddles are straight, rectangular and perpendicular to the reactor internal surface. The clearance between the paddles and the reactor internal surface is of a few millimeters, more preferably between 1 and 5 mm. Main items around the reactor design should be made of stainless steel. The coated catalyst is withdrawn at the end of the reactor. The level is ideally kept at about 30 to 50% and the valve opens sequentially. Nitrogen is sent into the withdrawal nozzle to prevent blocking.

Different nozzles are ideally installed on the reactor such as for level control, for temperature measurement or control, for gas phase analysis, for pressure control and for water and/or oxygen measurements.

Several nozzles are ideally provided to allow extra product inlets and outlets such as inert hydrocarbons like, e.g. pentane, purification agents, antistatics, water and micro-kill agent. This allows a reactor purification and a protection against reaction run-away. For safety reasons and for economics, it is preferred to recycle the outlet gases to the gas feeding section. This can be done through a small compressor. The coated catalyst can then be sent to a degasser. A counter current flow of nitrogen circulates upward from the bottom of the degasser. The coated catalyst is then ideally sent to a vessel for storage and then to the reactor.

There is also the preferred possibility to discharge continuously the coated catalyst directly into the main polymerisation reactor. In this case, the coated reactor is maintained at a slightly higher pressure (2 to 4 bar) than the polymerisation reactor.

The advantages associated with the use of the on line coating technique are hereafter discussed for different particular catalyst system:

Conventional Prepolymerised Mg/Ti Ziegler-Natta Catalysts

Replacement of traditional slurry prepolymer batch design by a cheaper design with lower fixed costs and no solvent recovery. Decrease of the prepolymer yield (from 20 to 50 g/mM down to 5 to 10 g/mM of titanium). Enable suppression of fines through the coating reactor recycling loop. Allow copolymerisation with additional potential benefits in terms of morphology and product quality. On line control of the coated catalyst avoids prepolymer batch sequencing difficulties with a better overall reproducibility and better reliability of downstream reactor operation. Full integration of the coating operation into the continuous polymerisation reaction system with no intermediate storage.

Chromium Catalyst

Same benefits as for above Ziegler-Natta plus better plant reliability with the continuous operation. Easier transitions from Ziegler to Chromium and vice versa. Product quality improved ESCR. Copolymerisation to deliver process productivity and product quality improvement for specific copolymer grades (film, wire and cable).

Conventional Supported SiO2/Mg/Ti Ziegler-Natta Catalysts

Less problems with catalyst dispersion, static, start up, impurities, allow for a higher initial activity, a higher catalyst yield and a higher Space Time Yield to be reached without facing agglomeration problems. Facilitate transitions to other catalyst systems. Lower cocatalyst ratio with product quality optimisation.

Metallocenes

Coating necessary for metallocene catalyst in order to optimise with a fully ready for use catalyst at a very high initial catalyst activity for large scale plants (high space time yield and low residence time). With the present invention system, it is possible to avoid static problems, sheeting and agglomerates formation during the scale up phase (morphology degradation problems). It allows for kinetics profile tuning with slower activation under the influence on the cocatalyst. It provides optimum flexibility between metallocenes and other catalyst systems.

What is claimed is:

1. A continuous process for the gas phase coating of polymerization catalyst comprising introducing particles of a polymerization catalyst into a gas phase plug flow reactor, which reactor is tubular and is horizontal or is declined with a downward angle formed with a horizontal base line of between 1 and 7°, said tubular reactor having a centrally located and rotatable drive shaft extending longitudinally through the tubular reactor to which are attached a plurality of adjacently located paddles, said paddles being located on said rotatable drive shaft such that they do not cause any backward movement of the catalyst particles as they flow through the reactor and extend transversely within the reactor with respect to the longitudinal direction of the drive shaft to a distance of from 1 to 5 mm from internal surfaces of the reactor and longitudinally along the length of the reactor and are straight, rectangular, and perpendicular to the internal surfaces of the reactor, wherein the catalyst particles are submitted to polymerization conditions in the presence of at least one gaseous monomer to coat the catalyst particles such that at least 95% by weight of the produced coated catalyst particles have a coating yield of between 0.5 to two times the average coating yield.

2. The process of claim 1 wherein substantially none of the polymerization catalyst particles subjected to the coating process exit the coating reactor in a non-polymerised form.

3. The process of claim 1 wherein substantially no coated polymerization catalyst particles exhibit a coating yield lower than 20% of the average coating yield.

4. The process of claim 1 wherein substantially no coated polymerization catalyst particles exhibit a coating yield higher than 180% of the average coating yield.

5. The process of claim 1, wherein successive paddles in the longitudinal direction of the drive shaft are oriented with respect to each other at an angle of from 30 to 7°.

6. The process of claim 5, wherein the reactor includes a plurality of paddle elements extending longitudinally along the length of the reactor, each element consisting of four of said paddles that rotate in the same plane transverse to the longitudinal direction of the drive shaft and are separated from each other by 90°.

* * * * *

UNITED STATES PATENT AND TRADEMARK OFFICE
CERTIFICATE OF CORRECTION

PATENT NO. : 6,656,524 B2
DATED : December 2, 2003
INVENTOR(S) : Daniel Claude Durand et al.

It is certified that error appears in the above-identified patent and that said Letters Patent is hereby corrected as shown below:

Column 10,
Line 51, "30 to 7º" should read -- 30 to 70º --.

Signed and Sealed this

Twenty-second Day of June, 2004

JON W. DUDAS
*Acting Director of the United States Patent and Trademark Office*